United States Patent [19]

Echols et al.

[11] Patent Number: 4,948,859
[45] Date of Patent: Aug. 14, 1990

[54] EXTRUDER POLYMERIZATION OF POLYURETHANES

[75] Inventors: Jimmie L. Echols, Maplewood; Walton J. Hammar, St. Paul; Thomas A. Kotnour, Faribault, all of Minn.

[73] Assignee: Minnesota Mining and Manufacturing Company, St. Paul, Minn.

[21] Appl. No.: 263,713

[22] Filed: Oct. 28, 1988

[51] Int. Cl.$^5$ .................. C08G 18/08; C08G 18/67
[52] U.S. Cl. .................................... 528/28; 528/75; 264/211.23; 264/211.24
[58] Field of Search ............... 264/211.23, 211.24; 528/75, 28

[56] References Cited

U.S. PATENT DOCUMENTS

| | | | |
|---|---|---|---|
| 3,233,025 | 2/1966 | Frye et al. | 264/176 |
| 3,642,964 | 2/1972 | Rausch, Jr. et al. | 264/40 |
| 3,963,679 | 6/1976 | Ullrich et al. | 260/75 NE |
| 4,139,674 | 2/1979 | Muller et al. | 428/339 |
| 4,286,080 | 8/1981 | Quiring et al. | 525/455 |
| 4,366,301 | 12/1982 | Le Roy et al. | 528/66 |
| 4,367,302 | 1/1983 | Le Roy et al. | 528/75 |
| 4,408,020 | 10/1983 | Kolycheck | 525/415 |
| 4,472,021 | 9/1984 | Ansel et al. | 350/96.23 |
| 4,595,709 | 6/1986 | Reischl | 521/79 |
| 4,619,979 | 10/1986 | Kotnour et al. | 526/88 |
| 4,762,884 | 8/1988 | Goyert et al. | 525/28 |
| 4,786,657 | 11/1988 | Hammar et al. | 528/75 |

FOREIGN PATENT DOCUMENTS 6359512 8/1986 Japan .
2067213 11/1980 United Kingdom .

Primary Examiner—Maurice J. Welsh
Assistant Examiner—Rabon Sergent
Attorney, Agent, or Firm—Donald M. Sell; Walter N. Kirn; Douglas B. Little

[57] ABSTRACT

Bulk polymerization process for making radiation curable polyurethanes which comprises:
(A) providing the following raw materials:
 (1) diisocyanate;
 (2) oligomeric diol>400 molecular weight; and
 (3) >1 chain extending monomer;
(B) reacting the raw materials in a twin screw extruder under the following conditions:
 (1) molar ratio of isocyanate to hydroxy moieties of about 1;
 (2) ratio of chain extending monomer to other monomers sufficient to yield a polymer having chain extender incorporated at 0.1 to 10 weight percent;
 (3) extruder temperature sufficient to initiate and maintain reaction; and
 (4) residence time sufficient to obtain substantially complete reaction of diisocyanate;
(C) cooling product polymer. Polyurethane product has weight average molecular weight greater than 80,000 and acrylate or methacrylate functionality. Process permits continuous production of radiation curable polyurethanes having narrow molecular weight distribution and high tensile strength.

12 Claims, No Drawings

EXTRUDER POLYMERIZATION OF POLYURETHANES

TECHNICAL FIELD

This invention relates to a continuous process for the bulk polymerization of polyurethanes. More specifically, it relates to the application of twin screw extruders as reactors for making radiation curable polyurethanes.

BACKGROUND

The synthesis of polyurethanes using extruder reactors is known to the art. Also, there are known various radiation curable polyurethanes, e.g., polyurethanes which cross link under the influence of ultraviolet or electron beam radiation. Such polymers are potentially useful in several fields, such as magnetic recording tape binders; automobile body protective coverings; wound management materials; and high moisture vapor transmission films. However, although the advantages of continuous processing in an extruder reactor (e.g., the ability to modify the polymer on line without stopping the process) are known, the necessary elevated temperature and shear conditions within an extruder have led to the belief that radiation curable functionalities such as acrylates would not survive the extrusion process.

DISCLOSURE OF INVENTION

This invention provides a process for making radiation curable polyurethanes having reactive groups by bulk polymerization in a twin screw extruder. It can be summarized as a process for bulk polymerization of polyurethanes which comprises:

(A) providing the following raw materials:
(1) at least one diisocyanate;
(2) at least one oligomeric diol such as polytetramethylene oxide (HO(CH$_2$CH$_2$CH$_2$CH$_2$O)$_x$H); and (3) at least one chain extending monomer having an acrylate or methacrylate moiety, such as 2-glyceryl methacrylate or 2-glyceryl acrylate;

(B) continuously conveying the above raw materials to a twin screw extruder and reacting them together to the desired degree of conversion in the extruder while conveying the reacting mass through the extruder under the following conditions:
(1) molar ratio of isocyanate to hydroxy moieties 1.00±0.05;
(2) ratio of chain extending monomer to other monomers sufficient to yield a polymer product having such chain extender incorporated therein to a level of from 0.1 to less than about 10 weight percent (more typically 0.5–5 percent);
(3) extruder barrel temperature sufficient to initiate and maintain reaction between the raw materials; and
(4) extruder configured to have a residence time sufficient to obtain substantially complete reaction of the diisocyanate as measured by infrared spectrometry of the extrudate; and (C) cooling the resulting product polymer from the discharge of the extruder; to yield a polyurethane having the following properties:
(i) weight average molecular weight greater than 80,000 (in many cases greater than 100,000 and in some greater than 200,000); and
(ii) acrylate or methacrylate functionality in the polymer molecule resulting from the chain extending monomer and which functionality survived the extruder reaction conditions.

Reactive extrusion allows one to prepare polymer in the extruder and extrude it in the final desired form. Both aliphatic and aromatic polyurethanes having the following characteristics (in addition to those listed above) can be made in this way:
1. narrow molecular weight distribution or polydispersity (p) or $M_w/M_n$, typically less than 3;
2. radiation (ultraviolet or electron beam) curable, the cured polymers being insoluble in organic solvents in which polyurethanes are commonly soluble;
3. high tensile strength.

The polymers may be considered block copolymers.

The term "oligomeric diol" means a high average molecular weight ($\geq 400$) diol. The diols used may be polyester, polycarbonate, polydimethylsiloxane, or polyether diols, or dihydroxy polyolefins such as dihydroxy polybutadiene.

The inventive process can further comprise the step of curing or cross-linking the product polymer by exposing it to radiation.

DETAILED DESCRIPTION

The organic diisocyanates used in the inventive process are described in general by the formula:

OCNR$_2$NCO wherein

R$_2$ is an alkylene, cycloalkylene, arylene, substituted-alkylene, substituted-cycloalkylene, substituted arylene or combinations thereof. They can include alicyclic, aliphatic and aromatic diisocyanates. The useful aliphatic and alicyclic diisocyanates include: 1,4-cyclohexane bis(methyleneisocyanate); dicyclohexyl methane 4,4'-diisocyanate; 1,4-cyclohexyl diisocyanate; hexamethylene diisocyanate; 1,6-diisocyanato-2,2,4,4-tetramethylhexane; 1,6-diisocyanato-2,4,4-trimethylhexane; isophorone diisocyanate; and $$\text{OCN(CH}_2\text{)}_4\text{CH}-\text{NCO}$$
$$|$$
$$\text{COOR}_3$$

wherein R$_3$ is —CH$_3$ or —C$_2$H$_5$.

The useful aromatic diisocyanates include napthalene-1,5-diisocyanate, diphenylmethane-4,4'-diisocyanate, toluene diisocyanate, p-phenylene diisocyanate, dibenzyl diisocyanate, diphenyl ether diisocyanate, m- and p-tetramethylxylene diisocyanate, and the like, such as are included in the general formula OCN—Ar—Y—Ar—NCO wherein Ar is cyclic, i.e. an arylene or alicyclic radical, and Y may be a carbon-to-carbon valence bond, an alkylene radical containing 1 to 5 carbon atoms, oxygen, sulfur, sulfoxide, sulfone or $$\begin{array}{c} R \\ | \\ -N- \end{array}$$

where R is an alkyl radical of 1 to 5 carbon atoms.

The oligomeric diols can be diols of a polyester, polyether, silicone diol or a combination thereof, of the formula:

HOR$_4$OH wherein R$_4$ is a polyether, polyester, polycarbonate or polydimethylsiloxane having a molecular weight of about 400 to 40,000.

Representative polyether glycol reactants, also termed poly(alkylene oxides), are essentially linear hydroxyl containing compounds having ether linkages. The molecular weights preferably vary between about 600 to 4,000. Examples of polyether glycols include hydroxyl terminated poly(propylene oxide), hydroxyl terminated poly(tetramethylene oxide), hydroxyl terminated poly(trimethylene oxide), hydroxyl terminated poly(hexamethylene oxide), hydroxyl terminated poly(ethylene oxide), and the like, of the formula HO[(CH$_2$)$_n$O]$_{x1}$H wherein n is an integer from 2 to 6 and x$_1$ is an integer from 5 to 600, and substituted types such as hydroxyl terminated poly(1,2-propylene oxides), hydroxy terminated poly(1,2-butylene oxide), tetrahydrofuran and ethylene oxide copolyethers, and the like.

Representative polyester glycol reactants include linear polyesters having molecular weights between about 400 and 10,000, and preferably about 1,000 to 4,000. The polyesters utilized include those prepared by the polymerization of esters of aliphatic dicarboxylic acids including, for example, adipic, succinic, pimelic, suberic, azelaic, sebacic and the like or their anhydrides. Aromatic dicarboxylic acids or their anhydrides or mixtures of aliphatic and aromatic dicarboxylic acids or their anhydrides may be used. Useful acids include aliphatic dicarboxylic acids of the formula HOOC—R$_5$—COOH where R$_5$ is an alkylene radical containing 1 to 10 carbon atoms, preferably 4 to 6 carbon atoms. The phthalic acids and their anhydrides are also useful. The glycols used in the preparation of the polyesters by reaction with the dicarboxylic acids are normally aliphatic diols containing between 2 and 10 carbon atoms, usually 2 to 6 carbon atoms, such as ethylene glycol propylene glycol, butanediol, hexamethylene diol, decamethylene diol, 2-ethylhexanediol, 1,6-neopentyl diol and the like. Representative polyester glycols may also include materials such as polycaprolactone diols.

Another oligomeric diol which may be used in the present invention is a silicone diol having the structure

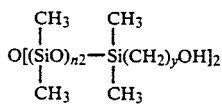

where n$_2$ is 2 to 800 and y=0 to 11.

The chain extending monomer can be selected from the group consisting of:

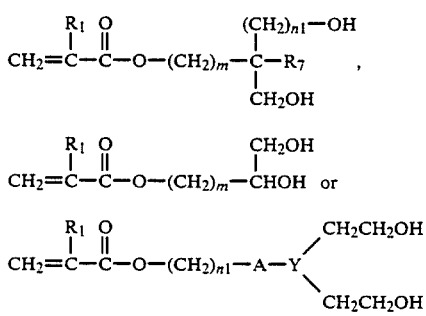

wherein m=0–4
n$_1$=1–4
R$_1$ is —H or —CH$_3$
R$_7$ is —H, —CH$_3$ or —C$_2$H$_5$
A is

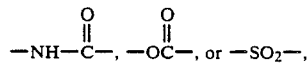

and
Y is

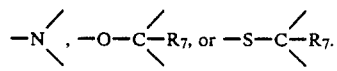

In addition to the diisocyanate, oligomeric diol and chain extending acrylate or methacrylate, a small glycol can be part of the monomer mix. A small or short chain glycol is a glycol of low average molecular weight (<400), typically of the formula

HOR$_6$OH wherein R$_6$ is an alkylene, cycloalkylene, arylene, substituted-alkylene, substituted-cycloalkylene, substituted-arylene or combination thereof. Examples of these are aliphatic, aromatic or ether glycols, containing 2 to 20 carbon atoms. Typical small glycols include ethylene diol, propylene diol, 1,6-hexanediol, 2-ethylhexanediol, 1,6-neopentyl diol, 1,4-butanediol, 2-butene-1,4-diol, diethylene glycol and the like. Cycloaliphatic glycols such as cyclohexanedimethanol, and aromatic-aliphatic glycols such as bis-1,4-(hydroxyethoxy)benzene, may also be employed. The amount of small glycol optionally used may vary from greater than 0 to 10 moles per mole of oligomeric diol.

Suitable additives, i.e., photoinitiators or photo-sensitizers, ultraviolet light stabilizers and inhibitors may be compounded with the polyurethane materials. Suitable photoinitiators include peroxides, ketones, aldehydes, alkyl halides, organometallics, disulfides, benzoin, benzil, organic polyhalides, and inorganic ions such as ferric ion complexes.

In general, the process steps can be performed as follows:

1. Diisocyanate and/or oligomeric diol capped with a diisocyanate is provided in a first vessel.
2. A mixture of at least one oligomeric diol and the chain extending acrylate or methacrylate monomer, plus any desired additives, the short chain diol, additional chain extenders, and catalysts is made in a second vessel.
3. The diisocyanate and/or diisocyanate prepolymer and the mixture from 2. are pumped to the inlet end of the twin screw extruder.
4. Typically, a positive displacement pump (e.g., Zenith die pump) is used at the discharge of the extruder to convey the extrudate to a quench bath.
5. The polymer extrudate is conveyed through the quench bath which can comprise a long rectangular tank containing water or another suitable cooling fluid such as an inert, non-polar, high boiling organic liquid.

6. The cooled polymer strand or film is dried, for example by an air stream or by passing over paper towels.
7. The dried polymer strand or film is reduced to a convenient form (e.g., by a pelletizer). The polymer can be made in a variety of forms, for example thin film, rod stock, fibers, tubes or blown microfibers.

The polyurethanes produced by the inventive process have very good physical properties, and they have been used in the fields mentioned in the Background section above as well as other fields in which polyurethanes are used. This process allows for preparation of the polyurethane entirely from monomers pumped into the extruder or making a prepolymer, pumping it into the extruder, and chain extending it in the twin screw extruder.

The reactions can be catalyzed or uncatalyzed. When catalyzed, the catalyst is normally a tin reagent such as dibutyl tin dilaurate or stannous octoate, preferably in amounts from about 0.01 to 10 phr (parts by weight per 100 parts by weight resin).

The twin screw extruder used should have relatively close clearance between the screw flight lands and the barrel, typical values being in the range of 0.25 to 0.5 mm. It can be either a corotating or counter-rotating twin screw apparatus. The extruder has been found to be such a good mixer that it is unnecessary to make a premix of the raw materials fed to the extruder inlet or to use kneading elements in the extruder.

In the research and development work which led to this invention, a 34 mm diameter, counter-rotating twin screw extruder made by Leistritz GmBH of Nurnberg, West Germany was used as the extruder reactor. It had a length to diameter ratio (L/D) of 35. The extruder screws comprised a number of separate sections which fit onto a common drive shaft. The screws could be disassembled and rearranged in various orders and orientations. The screws may have one pitch at the inlet section, another pitch in the middle of the screw length and another pitch toward the exit end of the extruder.

In addition, the barrel was divided into sections each of which could be either a heating section (i.e., a heating jacket) or a cooling section (i.e., jacket for circulating coolant). Consequently, one can control reaction temperature by adjustment of the temperatures of these zones. A typical extruder barrel temperature is about 200° C. The temperature in three of the 10 zones in the Leistritz apparatus was sometimes raised to about 250° C.

Since the extruder typically has several addition ports down its length, one can add reagents at several points along the reaction path. For instance, very sensitive reagents could be added closer to the exit of the extruder.

The ability to keep the double bonds from the acrylate or methacrylate groups from reacting in the extruder (yielding a substantially gel free polymer) is dependent on concentration and the use of stabilizers. Although the process allows making a polymer with up to 10 percent (meth)acrylate containing chain extender, the concentration of this extender in the reacting mass within the extruder at any given time should be no more than about five weight percent. In order to stay below that concentration yet reach a ratio of more than 5% in the product, it is possible to feed the (meth)acrylate containing chain extender to the extruder at more than one point along the extruder by feed ports down the barrel. Chemical free radical polymerization stabilizers (e.g., p-methoxyphenol) can also influence relative reactivity of the (meth)acrylate moieties.

Residence time distribution of the reactants in the twin screw extruder reactor is changed by the geometry of the reactor (e.g., screw geometry), the chemistry of the reaction itself, the temperatures at which the extruder barrel sections are controlled, and the rotational speed of the extruder screws. Typical residence times are less than 10 minutes.

The following additional parameters are typical of the process:
(1) Attempt to operate the twin screw extruder in order to maximize current flow to the extruder motor (amps) because this condition indicates maximizing molecular weight.
(2) Run the twin screw extruder full.
(3) Feed the raw materials to the extruder feed zone at a pressure of about 69 kPa.

A further aspect of the invention is the formation of interpenetrating polymer networks (IPNs). The term IPN denotes a class of materials which contain at least two polymers, each in network form. The two polymers must have been synthesized or crosslinked in the presence of each other, and they cannot be physically separated. IPNs may be thought of as two polymer networks which have been interwoven or which have become inextricably tangled together in three dimensions. IPNs have a unique set of physical properties often different from the properties of either constituent polymer itself. In order to make an IPN, a monoacrylate or polyacrylate can be added to the twin screw extruder at a zone near the discharge end, for example the seventh zone, to obtain mixing without premature acrylate polymerization. Example 11 teaches how to make an IPN by this process.

The invention will be further clarified by consideration of the following Examples which are intended to be purely exemplary. In all of the examples, if the water content of the PTMO and 1,4—butane diol was above 0.05 weight percent, it was reduced to below that level by heating the materials to 110° C. with agitation in a closed vessel while pulling a vacuum of 10 mm or less for a period of 3 hours. If the water level remained above 0.05% after this dehydration operation, the procedure was repeated a second time for a period of 2 hours.

EXAMPLE 1

The twin screw extruder had ten 120 mm zones which were configured as follows:

| Zone | Screw Pitch |
|---|---|
| Feed | 12 mm transitioning to 6 mm single start helix |
| 1 | 6 mm single start helix |
| 2 | 6 mm single start helix |
| 3 | 6 mm single start helix |
| 4 | 6 mm single start helix |
| 5 | 6 mm single start helix |
| 6 | 6 mm single start helix |
| 7 | first 90 mm - 6 mm single start helix, last 30 mm - 30 mm triple start helix |
| 8 | 30 mm triple start helix |
| 9 | first 30 mm - 30 mm triple start helix, last 90 mm - 6 mm single start helix |

There was also a heated end block or connecting zone.

Diols and isocyanate reactants were maintained in individual storage tanks under a nitrogen atmosphere and the reactants pumped into the first zone of the extruder by means of two gear pumps in series in each feed line. A homogeneous diol feed was achieved by heating a mixture of the various components to approximately 55° C. and mixing. The diol feed was maintained at 55° C. and stirred throughout the extrusion run.

The extrudate was fed directly into a die pump, which helped control pressures at the discharge of the extruder, which was, in turn, connected to a film die (30.5 cm wide) by means of a neck tube. Each of the ten zones of the extruder as well as the die pump, the neck tube and the film die were maintained at a nominal 200° C. throughout extrusion of the polyurethane material.

| DIOL FEED | |
|---|---|
| Weight Percent | Reactant |
| 85.72 | PTMO 1000[1] |
| 10.99 | 1,4-Butane Diol[2] |
| 1.56 | 2-Glyceryl Methacrylate[3] |
| 0.79 | Tinuvin 770[4] |
| 0.79 | Tinuvin 328[5] |
| 0.08 | Dibutyl Tin Dilaurate[6] |
| 0.08 | p-Methoxyphenol[7] |

[1]Polytetramethylene Oxide (MW approx. 1000).
[2]Available from GAF Corp., Wayne, NJ.
[3]2-GMA, preparation described in U.S. Pat. No. 4,578,504.
[4]Bis-(2,2,6,6-tetramethyl-4-piperidyl)sebacate, available from Ciba Geigy Corp., Plastics and Additives Div., Hawthorne, NY.
[5]2-(2'-Hydroxy-3',5'-di-tert-amylphenyl)benzotriazole, available from Ciba Geigy Corp., Plastics and Additives Div., Hawthorne, NY.
[6]Available from M & T Chemicals, Rahway, NJ.
[7]MEHQ, available from J. T. Baker Chemical Co., Phillipsburg, NJ.

ISOCYANATE FEED

Desmodur W—$H_{12}$MDI, Dicyclohexylmethane—4,4'-Diisocyanate, MW 262, available from Mobay Corp., Pittsburg, Pa.

The extruder speed was set at 28–31 rpm and the diol and isocyanate feeds adjusted to provide a NCO/OH moles per minute feed ratio of 1.02 at a total flow rate of 40 grams per minute with the die pump operating at 7-7.2 rpm. An approximately 6 mil (152 micrometer) thick film of the polyurethane was extruded onto a single coated silicone release paper on a chilled (20° C.) collector roll.

As extruded, the cross-linkable polyurethane film was soluble in dimethyl acetamide (DMAc) but after exposure to E-beam irradiation (5 megarads at 150 kV under a nitrogen purge at a rate of about 7.6 meters per minute) the film was insoluble. A control sample of polyurethane film of identical composition except that it contained no 2-GMA did not cross-link on exposure to an equivalent E-beam irradiation as is evidenced by the fact that it remained soluble in DMAc after irradiation. Similarly, a film prepared from a solution blend of the same control sample and approximately 1 percent 2-GMA monomer did not cross-link and become insoluble in DMAc after exposure to comparable E-beam irradiation.

EXAMPLE 2

The procedure described in Example 1 was used to prepare a 6 mil (152μm) thick cross-linkable polyurethane film from a Desmodur W isocyanate feed and the following diol feed:

| DIOL FEED | |
|---|---|
| Weight Percent | Reactant |
| 85.58 | PTMO 1000 |
| 10.97 | 1,4-Butane Diol |
| 1.56 | 2-Glyceryl Methacrylate |
| 0.79 | Tinuvin 770 |
| 0.79 | Tinuvin 328 |
| 0.08 | Dibutyl Tin Dilaurate |
| 0.08 | p-Methoxyphenol |
| 0.16 | Benzoin sec-Butyl Ether[8] |

[8]Available from Aldrich Chemicals, Milwaukee, WI.

The extruder speed was set at 30 rpm and the diol and isocyanate feeds adjusted to provide a NCO/OH moles per minute feed ratio of 1.02 at a total flow rate of 40 grams per minute with the die pump operating at 7.2 rpm.

The film produced from this composition was cross-linked by passing it through a RPC Industries UV Processor (Plainfield IL) equipped with medium pressure UV lamps operating at 400 volts and 7.5 amps at a rate of about 9 meters per minute under a nitrogen atmosphere. The cross-linked film was insoluble in DMAc.

EXAMPLE 3

A procedure similar to that described in Example 1 was used to prepare cross-linkable polyurethane pellets from a Desmodur W isocyanate feed and the following diol feed:

| DIOL FEED | |
|---|---|
| Weight Percent | Reactant |
| 85.49 | PTMO 1000 |
| 11.22 | 1,4-Butane Diol |
| 1.55 | 2{-N',N'-[bis-2-hydroxyethylureido]ethyl} methacrylate[9] |
| 0.79 | Tinuvin 770 |
| 0.79 | Tinuvin 328 |
| 0.08 | Dibutyl Tin Dilaurate |
| 0.08 | p-Methoxyphenol |

[9]Prepared by reacting isocyanato ethyl methacrylate and N,N -bis-(2-hydroxyethyl) amine.

The extruder speed was set at 30–31 rpm and the diol and isocyanate feeds adjusted to provide a NCO/OH moles per minute feed ratio of 1.02 at a total flow rate of 40 grams per minute with the die pump operating at 7.2–7.3 rpm.

The film die was removed for this experiment and the extrudate stream from the neck tube was directed into a water quench bath. The polymer filament was passed over a roll of paper toweling to partially dry it prior to pelletizing in a Con-Air Pelletizer.

An approximately 10 mil (254μm) thick film was prepared from the above described pellets by pressing the pellets between two pieces of polyester film at about 345 MPa pressure at 160° C. As pressed, the film was soluble in DMAc but after exposure to E-beam radiation conditions of Example 1 it was insoluble.

EXAMPLE 4

A pelletized cross-linkable polyurethane was prepared according to the procedure described in EXAMPLE 3 from a Desmodur W isocyanate feed and the following diol feed:

| DIOL FEED | |
|---|---|
| Weight Percent | Reactant |
| 85.72 | PTMO 1000 |
| 10.99 | 1,4-Butane Diol |
| 1.56 | 1-Glyceryl Methacrylate[10] |
| 0.79 | Tinuvin 770 |
| 0.79 | Tinuvin 328 |
| 0.08 | Dibutyl Tin Dilaurate |
| 0.08 | p-Methoxyphenol |

[10] Prepared according to the procedure described in U.S. Pat. No. 3,957,362.

The extruder speed was set at 30 rpm and the diol and isocyanate feeds adjusted to provide a NCO/OH moles per minute feed ratio of 1.02 to 1.03 at a total flow rate of 40 grams per minute with the die pump operating at 7.2 rpm.

An approximately 10 mil (254μm) thick film was prepared from the above described pellets by pressing the pellets between two pieces of polyester film at about 34.5 MPa at 160° C. As pressed, the film was soluble in DMAc but after exposure to E-beam radiation as above it was insoluble.

EXAMPLE 5

A pelletized cross-linkable polyurethane was prepared according to the procedure described in EXAMPLE 3 from a Desmodur W isocyanate feed and the following diol feed:

| DIOL FEED | |
|---|---|
| Weight Percent | Reactant |
| 85.64 | PTMO 1000 |
| 11.07 | 1,4-Butane Diol |
| 1.56 | Mono Methacrylate of Trimethylol Ethane[11] |
| 0.79 | Tinuvin 770 |
| 0.79 | Tinuvin 328 |
| 0.08 | Dibutyl Tin Dilaurate |
| 0.08 | p-Methoxyphenol |

[11] Prepared using a procedure similar to that described in U.S. Pat. No. 3,210,327.

The extruder speed was set at 30 rpm and the diol and isocyanate feeds adjusted to provide a NCO/OH moles per minute feed ratio of 1.02 at a total flow rate of 40 grams per minute with the die pump operating at about 7 rpm.

An approximately 10 mil thick film was prepared from the above described pellets by pressing the pellets between two pieces of polyester film at about 34.5 MPa at 160° C. As pressed, the film was soluble in DMAc but after exposure to E-beam radiation conditions of Example 1 it was insoluble.

EXAMPLE 6

A pelletized cross-linkable polyurethane was prepared according to the procedure described in EXAMPLE 3 from a Desmodur W isocyanate feed and the following diol feed:

| DIOL FEED | |
|---|---|
| Weight Percent | Reactant |
| 86.81 | PTMO 1000 |
| 11.46 | 1,4-Butane Diol |
| 1.58 | Monoacrylate of Trimethylol Ethane[11] |
| 0.08 | Dibutyl Tin Dilaurate |
| 0.08 | p-Methoxyphenol |

[11] Prepared using a procedure similar to that described in U.S. Pat. No. 3,210,327.

The extruder speed was set at 36–41 rpm and the diol and isocyanate feeds adjusted to provide a NCO/OH moles per minute feed ratio of 1.0 at an initial total flow rate of 40 grams per minute with the die pump operating at 6.8–7.2 rpm. The feed pump speeds were then adjusted to maintain the same NCO/OH feed ratio but a total flow rate of 80 grams per minute with an extruder speed of 63 rpm and the die pump operating at 14–14.9 rpm.

An approximately 10 mil thick film was prepared from the above described pellets by pressing the pellets between two pieces of polyester film at about 34.5 MPa at 160° C. As pressed, the film was soluble in DMAc but after exposure to E-beam radiation conditions of Example 1 it was insoluble.

EXAMPLE 7

A pelletized cross-linkable polyurethane was prepared according to the procedure described in Example 3 from a Desmodur W isocyanate feed and the following diol feed:

| DIOL FEED | |
|---|---|
| Weight Percent | Reactant |
| 83.44 | Rucoflex S102-55[12] |
| 13.35 | 1,4-Butane Diol |
| 1.52 | 2-Glyceryl Methacrylate |
| 0.77 | Tinuvin 770 |
| 0.77 | Tinuvin 328 |
| 0.08 | Dibutyl Tin Dilaurate |
| 0.08 | p-Methoxyphenol |

[12] A hydroxy terminated butylene adipate polyester copolymer, MW 1975.35, available from Ruco Polymer Corp., Hicksville, NY.

The extruder speed was set at 50 rpm and the diol and isocyanate feeds adjusted to provide a NCO/OH moles per minute feed ratio of 1.00–1.02 at a total flow rate of 40 grams per minute with the die pump operating at 6.8 rpm.

An approximately 10 mil thick film was prepared from the above described pellets by pressing the pellets between two pieces of polyester film at about 34.5 MPa at 160° C. As pressed, the film was soluble in DMAc but after exposure to E-beam radiation conditions of Example 1 it was insoluble.

EXAMPLE 8

A pelletized cross-linkable polyurethane was prepared according to the procedure described in Example 3 from the following diol and isocyanate feeds:

| DIOL FEED | |
|---|---|
| Weight Percent | Reactant |
| 83.62 | PTMO 1000 |
| 13.17 | 1,4-Butane Diol |
| 1.52 | 2-Glyceryl Methacrylate |
| 0.77 | Tinuvin 770 |
| 0.77 | Tinuvin 328 |
| 0.08 | Dibutyl Tin Dilaurate |

| DIOL FEED | |
|---|---|
| Weight Percent | Reactant |
| 0.08 | p-Methoxyphenol |

ISOCYANATE FEED

Isophorone Diisocyanate—MW 222.28, available from Muddex Inc., Piscataway, N.J.

Because isophorone diisocyanate is significantly less reactive than $H_{12}MDI$ (Desmodur W) the temperature of the feed zone and zones 1–3 was increased to a nominal 240°–250° C. and the temperature of zones 4–9 was maintained at a nominal 200° C. for this experiment. The extruder speed was set at 45–47 rpm and the diol and isocyanate feeds adjusted to provide a NCO/OH moles per minute feed ratio of 1.017 at a total flow rate of 40 grams per minute with the die pump operating at 6.8 rpm.

An approximately 10 mil thick film was prepared from the above described pellets by pressing the pellets between two pieces of polyester film at about 34.5 MPa at 160° C. As pressed, the film was soluble in DMAc but after exposure to E-beam radiation conditions of Example 1 it was insoluble.

EXAMPLE 9

A pelletized cross-linkable polyurethane was prepared according to the procedure described in Example 3 from a Desmodur W Isocyanate feed and the following diol feed:

| DIOL FEED | |
|---|---|
| Weight Percent | Reactant |
| 79.64 | PTMO 1000 |
| 12.54 | 1,4-Butane Diol |
| 1.45 | 1-Glyceryl Methacrylate |
| 4.76 | Oligomeric Dimethacrylate[13] |
| 0.73 | Tinuvin 770 |
| 0.73 | Tinuvin 328 |
| 0.07 | Dimethyl Tin Dilaurate[14] |
| 0.07 | p-Methoxyphenol |

[13]Prepared by adding hydroxyethyl methacrylate to PCA5-1, a polytetramethylene oxide capped with $H_{12}MDI$ (available from Polymethane Specialities Co., Inc., Lindhurst, NJ) and heating at 70° C. with stirring under a $N_2$ atmosphere for 2 hours.
[14]Available from Witco Chemicals, New York, NY.

The extruder speed was set at 30–46 rpm and the diol and isocyanate feeds adjusted to provide a NCO/OH moles per minute feed ratio of 0.98–1.017 at a total flow rate of 40 grams per minute with the die pump operating at 7.3 rpm. Little if any reaction occurred at these conditions as judged by a large isocyanate peak in the infrared spectrum of the extrudate, so an additional 5 grams of dimethyl tin dilaurate was added to the diol feed and the temperature of zones 3–5 increased to a nominal 230° C. The average draw decreased at there conditions so the temperature of zones 3–5 was increased a second time to a nominal 250° C. which brought the amperage draw to 2 amps and decreased the isocyanate peak in the infrared spectrum of the extrudate, indicative of reaction between the diols and isocyanate.

An approximately 10 mil thick film was prepared from the above described pellets by pressing the pellets between two pieces of polyester film at about 34.5 MPa at 160° C. As pressed, the film was soluble in DMAc but after exposure to E-beam radiation conditions of Example 1 it was insoluble.

EXAMPLE 10

A procedure similar to that described in Example 1 except that the extruder screw configuration consisted of a 6 mm single start helix in zones 1–9; and the film was extruded directly into a water quench tank was used to prepare three approximately 12 mil (304μm) thick polyurethane cross-linkable films having nominal 2-GMA concentrations of 0.5, 1.0 and 3.0 weight percent from a Desmodur W isocyanate feed and the following initial diol feed:

| DIOL FEED | |
|---|---|
| Weight Percent | Reactant |
| 75.67 | PTMO 1000 |
| 23.18 | 1,4-Butane Diol |
| 0.96 | 2-Glyceryl Methacrylate |
| 0.1 | Dibutyl Tin Dilaurate |
| 0.1 | p-Methoxyphenol |

The extruder speed was set at 100 rpm and the diol and isocyanate feeds adjusted to provide a NCO/OH moles per minute feed ratio of 1.025 at a total flow rate of 40 grams per minute with the die pump operating at 7.2–7.4 rpm.

After approximately 2.5 hours, 2—glyceryl methacrylate was added to the diol feed tank to provide a nominal 1.92 weight percent 2-GMA content in the diol feed and the diol and isocyanate feeds adjusted to provide a NCO/OH moles per minute feed ratio of 1.025.

After approximately another 2.5 hours, a second addition of 2-GMA to the diol feed was made to provide a nominal 5.52 weight percent 2-GMA content in the diol feed and the isocyanate and diol feeds adjacent to provide a NCO/OH moles per minute feed ratio of 1.025.

The final composition of the three films was as follows:

| | Final Film Composition | | |
|---|---|---|---|
| | Nominal 2-GMA Content In Film | | |
| Reactant | (0.5%) | (1.0%) | (3.0%) |
| PTMO 1000 | 39.50 | 38.98 | 37.00 |
| 1,4-Butane Diol | 12.10 | 11.95 | 11.33 |
| 2-Glyceryl Methacrylate | 0.50 | 1.00 | 2.83 |
| Dibutyl Tin Dilaurate | 0.05 | 0.05 | 0.05 |
| p-Methoxyphenol | 0.05 | 0.05 | 0.05 |
| Desmodur W | 47.90 | 48.00 | 48.75 |

As extruded, all three film samples were soluble in DMAc but after exposure to E-beam irradiation (5 megarads at 300 KV under a $N_2$ atmosphere at a rate of about 7.6 meters per minute) the films were all insoluble in DMAc. Mechanical properties (stress at break and elongation) of the uncross-linked and cross-linked films as determined using an Instron Model TTCH Test Apparatus (available from Instron Engineering Corp., Canton, MA) at a cross-head rate of 20 cm/minute were:

| Film Mechanical Properties | | |
| --- | --- | --- |
| Sample (Wt. % 2-GMA) | Stress at Break (MPa) | Elongation at Break (%) |
| 0.5 | 68.28 | 300 |
| 0.5 (X-LKD) | 59.31 | 280 |
| 1.0 | 72.41 | 320 |
| 1.0 (X-LKD) | 73.10 | 300 |
| 3.0 | 73.10 | 320 |
| 3.0 (X-LKD) | 58.62 | 240 |

The mechanical properties of the cross-linked films demonstrate that strength of the films is maintained at a high level over the compositional range investigated but, as the 2-GMA content of the film increases, the elongation of the film decreases.

EXAMPLE 11

A procedure similar to that described in Example 1 except that the extruder was equipped with a Ruska positive displacement pump feeding into zone 7, and the extrudate stream was collected in aluminum trays and was used to prepare cross-linkable polyurethane filaments containing nominally 10 and 20 weight percent cyclohexyl methacrylate. The polymer was prepared from a Desmodur W isocyanate feed and the following diol feed:

| DIOL FEED | |
| --- | --- |
| Weight Percent | Reactant |
| 85.36 | PTMO 1000 |
| 11.21 | 1,4-Butane Diol |
| 1.55 | 2-Glyceryl Methacrylate |
| 0.79 | Tinuvin 770 |
| 0.79 | Tinuvin 328 |
| 0.08 | Dibutyl Tin Dilaurate |
| 0.08 | p-Methoxyphenol |
| 0.16 | Benzoin sec-Butyl Ether |

The extruder speed was set at 28 rpm and the diol and isocyanate feeds adjusted to provide a NCO/OH moles per minute feed ratio of 1.0 at a total flow rate of 40 grams per minute with the die pump operating at 7.0 rpm. After the system had stabilized (approximately ¼ hour) the temperature in zones 7-9 and the end block was reduced to a nominal 185° C. and cyclohexyl methacrylate (available from Polysciences, Inc., Worthington PA) introduced into zone 7 of the extruder using the Ruska pump, adjusting the pump speed to deliver the cyclohexyl methacrylate into the polyurethane filament at a nominal 10 weight percent level (total flow rate on addition of the cyclohexyl methacrylate increased to 44 grams per minute).

After approximately an additional ½ hour the cyclohexyl methacrylate feed rate was adjusted to deliver the cyclohexyl methacrylate into the polyurethane filament at a nominal 20 weight percent level (total flow rate on addition of the cyclohexyl methacrylate increased to 48 grams per minute).

The two polyurethane filaments were cut into pellets and pressed into films approximately 5 mils thick by pressing the pellets between polyester film at about 34.5 MPa at 120° C. As pressed, the films were soluble in DMAc, but after two passes through a RPC UV Processor under conditions described in Example 2, the film having 10 weight percent cyclohexyl methacrylate was insoluble in DMAc while the film containing 20 weight percent cyclohexyl methacrylate was still soluble. Both types of film (10 and 20% cyclohexyl methacrylate) were exposed to 5 Mrads electron beam dose (200 KV at 7.6 m/min. under $N_2$ atmosphere) after which both were found to be insoluble in DMAc at 100° C.

The term substantially complete as used with reference to completion of diisocyanate reaction means that no more than 0.7 weight percent diisocyanate remains in the product. This quantity could be found by infrared analysis, assuming that the residual isocyanate is all attributable to the monomeric species.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A process for bulk polymerization of polyurethanes which comprises:
   (A) providing the following raw materials:
      (1) at least one diisocyanate;
      (2) at least one oligomeric diol having a molecular weight of at least 400; and
      (3) at least one chain extending monomer having an acrylate or methacrylate moiety;
   (B) continuously conveying the above raw materials to a twin screw extruder and reacting them together to the desired degree of conversion in the extruder while conveying the reacting mass through the extruder under the following conditions:
      (1), molar ratio of isocyanate to hydroxy moieties 1.00±0.05;
      (2) ratio of chain extending monomer to other monomers sufficient to yield a polymer product having such chain extender incorporated therein to a level of from 0.1 to less than about 10 weight percent;
      (3) extruder barrel temperature sufficient to initiate and maintain reaction between the raw materials; and a residence time
      (4) extruder configured to have sufficient to obtain substantially complete reaction of the diisocyanate as measured by infrared spectrometry of the extrudate; and
   (C) cooling the resulting product polymer from the discharge of the extruder; to yield a polyurethane having the following properties:
      (i) weight average molecular weight greater than 80,000; and
      (ii) acrylate or methacrylate functionality in the polymer molecule resulting from the chain extending monomer and which functionality survived the extruder reaction conditions.

2. A process for bulk polymerization of polyurethane which comprises:
   (A) providing the following raw materials:
      (1) at least one diisocyanate;
      (2) at least one oligomeric diol having a molecular weight of at least 400; and
      (3) at least one chain extending monomer having an acrylate or methacrylate
   moiety and selected from the group consisting of monomers having the formulas:

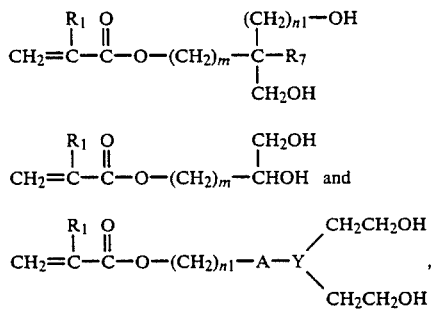

wherein
m = 0–4
$n_1 = 1-4$
R1 is —H or —CH$_3$
R$_7$ is —H, —CH$_3$, or —C$_2$H$_5$
A is

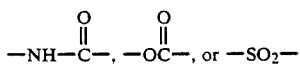

Y is

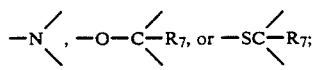

(B) continuously conveying the above raw materials to a twin screw extruder and reacting them together to a desired degree of conversion in the extruder while conveying the reacting mass through the extruder under the following conditions:
(1) molar ratio of isocyanate to hydroxy moieties 1.00±0.05;
(2) ratio of chain extending monomer to other monomers sufficient to yield a polymer product having such chain extender incorporated therein to a level of from 0.5 to less than about 10 weight percent;
(3) extruder barrel temperature sufficient to initiate and maintain reaction between the raw materials; and
(4) extruder configured to have a residence time sufficient to obtain substantially complete reaction of the diisocyanate as measured by infrared spectrometry of the extrudate; and
(C) cooling the resulting product polymer from the discharge of the extruder; to yield a polyurethane having the following properties:
(i) weight average molecular weight greater than 80,000; and
(ii) acrylate or methacrylate functionality in the polymer molecule resulting from the chain extending monomer and which functionality survived the extruder reaction conditions.

3. The process of claim 2 which further comprises curing the product polymer by exposing it to radiation.

4. The process of claim 2 wherein a prepolymer of the diisocyanate and the oligomeric diol is made before step (B).

5. The process of claim 2 wherein the diisocyanate is selected from the group consisting of: aliphatic diisocyanates selected from hexamethylene diisocyanate; 1,6-diisocyanato-2,2,4,4-tetramethylhexane; 1,6-diisocyanato-2,4,4-trimethylhexane; diisocyanates with the formula

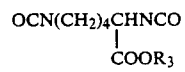

wherein R$_3$ is —CH$_3$ or C$_2$H$_5$; alicyclic diisocyanates selected from 1,4-cyclohexane bis(methyleneisocyanate); dicyclohexylmethane 4,4'-diisocyanate; 1,4-cyclohexyl diisocyanate; and aromatic diisocyanates having the formula OCN-Ar-Y-Ar-NCO wherein Ar is cyclic, and Y may be a carbon-to-carbon valence bond, an alkylene radical containing 1 to 5 carbon atoms, oxygen, sulfur, sulfoxide, sulfone or

where R is an alkyl radical of 1 to 5 carbon atoms.

6. The process of claim 2 wherein the oligomeric diol is selected from the group consisting of linear hydroxyl containing compounds having the following formula

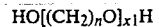

wherein n is an integer from 2 to 6 and $x_1$ is an integer from 5 to 600; hydroxyl terminated poly(1,2-propylene oxides); hydroxy terminated poly(1,2-butylene oxide); hydroxy-substituted tetrahydrofuran; and hydroxyl terminated ethylene oxide copolyethers; polyesters prepared by polymerization of esters of dicarboxylic acids or their anhydrides with at least one glycol having 2–10 carbon atoms and silicone diols having the following

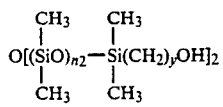

where in $n_2 = 2-800$ and $y = 0-11$.

7. The process of claim 2 wherein the raw materials further comprise a short chain glycol selected from aliphatic, cycloaliphatic and aromatic glycols having a molecular weight less than 400.

8. The process of claim 7 wherein the short chain diol is selected from the group consisting of ethylene diol, propylene diol, 1,6-hexanediol, 2-ethylhexanediol, 1,6-neopentyl diol, 1,4-butanediol, 2-butene-1,4-diol, diethylene glycol, cyclohexanedimethanol, and bis-1,4-(hydroxyethoxy)benzene.

9. The process of claim 7 wherein the amount of short chain diol used is from greater than 0 to 10 moles per mole of oligomeric diol.

10. The process of claim 2 which further comprises making an interpenetrating polymer network by adding to the twin screw extruder near the discharge end a monomer selected from acrylates and methacrylates.

11. The process of claim 2 wherein the concentration of chain extender within the reacting mass in the twin screw extruder is maintained at or below 5 weight percent.

12. A process for bulk polymerization of polyurethanes which comprises:

(A) providing the following raw materials:
(1) at least one diisocyanate;
(2) at least one oligomeric diol having a molecular weight of at least 400; and
(3) at least one chain extending monomer having an acrylate or methacrylate moiety and selected from the group consisting of monomers having the formulas:

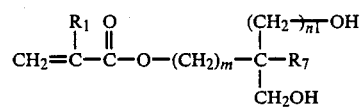

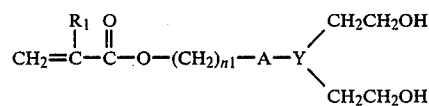

wherein
m = 0–4
$n_1$ = 1–4
$R_1$ is —H or —$CH_3$
$R_7$ is —H, —$CH_3$, or —$C_2H_5$
A is

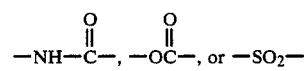

and
Y is

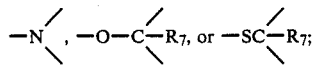

(B) continuously conveying the above raw materials to a thin screw extruder and reacting them together to the desired degree of conversion in the extruder while conveying the reacting mass through the extruder under the following conditions:
(1) molar ratio of isocyanate to hydroxy moieties 1.00±0.05;
(2) ratio of chain extending monomer to other monomers sufficient to yield a polymer product having such chain extender incorporated therein to a level of from 0.5 to less than about 10 weight percent;
(3) extruder barrel temperature sufficient to initiate and maintain reaction between the raw materials; and
(4) extruder configured to have a residence time sufficient to obtain substantially complete reaction of the diisocyanate as measured by infrared spectrometry of the extrudate; and
(C) cooling the resulting product polymer from the discharge of the extruder; to yield a polyurethane having the following properties:
(i) weight average molecular weight greater than 80,000; and
(ii) acrylate or methacrylate functionality in the polymer molecule in which said functionality survived the extruder reaction conditions.

* * * * *

UNITED STATES PATENT AND TRADEMARK OFFICE
CERTIFICATE OF CORRECTION

PATENT NO. : 4,948,859

DATED : August 14, 1990

INVENTOR(S) : J. L. Echols et al

It is certified that error appears in the above-identified patent and that said Letters Patent is hereby corrected as shown below:

| | |
|---|---|
| Col. 6, line 40 | PTMO and 1, 4 should be PTMO 1000 and 1, 4 |
| Col. 11, line 59 | the word "there" should be "these" |
| Col. 12, line 41 | the word "adjacent" should be "adjusted" |
| Col. 14, line 44 | delete the words "a residence time" |
| Col. 14, line 46 | after the word "have" insert the words "a residence time" |
| Col. 14, line 59 | "polyurethane" should be "polyurethanes" |
| Col. 15, line 24 | after the formula insert the word "and" |
| Col. 15, line 36 | the word "a" should be "the" |
| Col. 15, line 47 | "barre 1" should be "barrel" |

Signed and Sealed this

Thirty-first Day of December, 1991

Attest:

HARRY F. MANBECK, JR.

*Attesting Officer*     *Commissioner of Patents and Trademarks*